United States Patent [19]

Sivers et al.

[11] 3,998,290
[45] Dec. 21, 1976

[54] ARRANGEMENT FOR SUPPORT OF A MOTOR VEHICLE DRIVE UNIT

[75] Inventors: Rolf V. Sivers, Warmbronn; Reimer Pilgrim, Ditzingen; Wolfgang Hanisch, Wimsheim; Erich Stotz, Rommelshausen, all of Germany

[73] Assignee: Dr. Ing. h. c. F. Porsche Aktiengesellschaft, Germany

[22] Filed: Dec. 6, 1974

[21] Appl. No.: 530,297

[52] U.S. Cl. .............................. 180/70 P; 180/64 R
[51] Int. Cl.² ........................................ B60K 17/22
[58] Field of Search ............ 180/70 R, 70 P, 54 R, 180/64 R, 57; 308/27, 28; 248/9, 54 R, 60

[56] References Cited
UNITED STATES PATENTS

| | | | |
|---|---|---|---|
| 2,014,670 | 9/1935 | Roche | 180/54 R |
| 2,081,213 | 5/1937 | Anibal | 180/64 R X |
| 2,086,370 | 7/1937 | Taub | 180/64 R X |
| 2,373,356 | 4/1945 | Thoms | 180/54 R |
| 3,037,573 | 6/1962 | Larsen | 180/70 P |
| 3,101,126 | 8/1963 | Herr | 180/70 P X |
| 3,155,187 | 11/1964 | DeLorean | 180/70 P |
| 3,167,149 | 1/1965 | Miller | 180/70 R |
| 3,181,642 | 5/1965 | Damitz | 180/70 P |
| 3,219,138 | 11/1965 | Kishline | 180/64 R X |
| 3,292,389 | 12/1966 | Adloff | 180/70 P X |

Primary Examiner—M. H. Wood, Jr.
Assistant Examiner—Terrance L. Siemens
Attorney, Agent, or Firm—Craig & Antonelli

[57] ABSTRACT

An arrangement for the mounting support of a drive unit of a motor vehicle which consists of an internal combustion engine with a clutch, of at least one change-speed transmission and of an axle gear, whereby preferably the change-speed transmission together with the axle gear is combined into a rear drive unit provided in the rear section of the vehicle and a tubular support member disposed in the vehicle longitudinal direction connects with each other the front drive unit consisting of the engine and the clutch with the rear drive unit; the internal combustion engine arranged in the front section of the vehicle is also drivingly connected with the rear drive unit by way of a drive shaft arranged on the inside of the tubular support member; the internal combustion engine together with the clutch, the tubular support member and the rear drive unit are thereby fastened at the vehicle body, frame or the like by way of elastic members which are mounted within the areas of low vibrations of the aggregates of the drive unit and are retained at least in part within mounting supports that are form-rigid yet vibration and oscillation damping.

27 Claims, 15 Drawing Figures

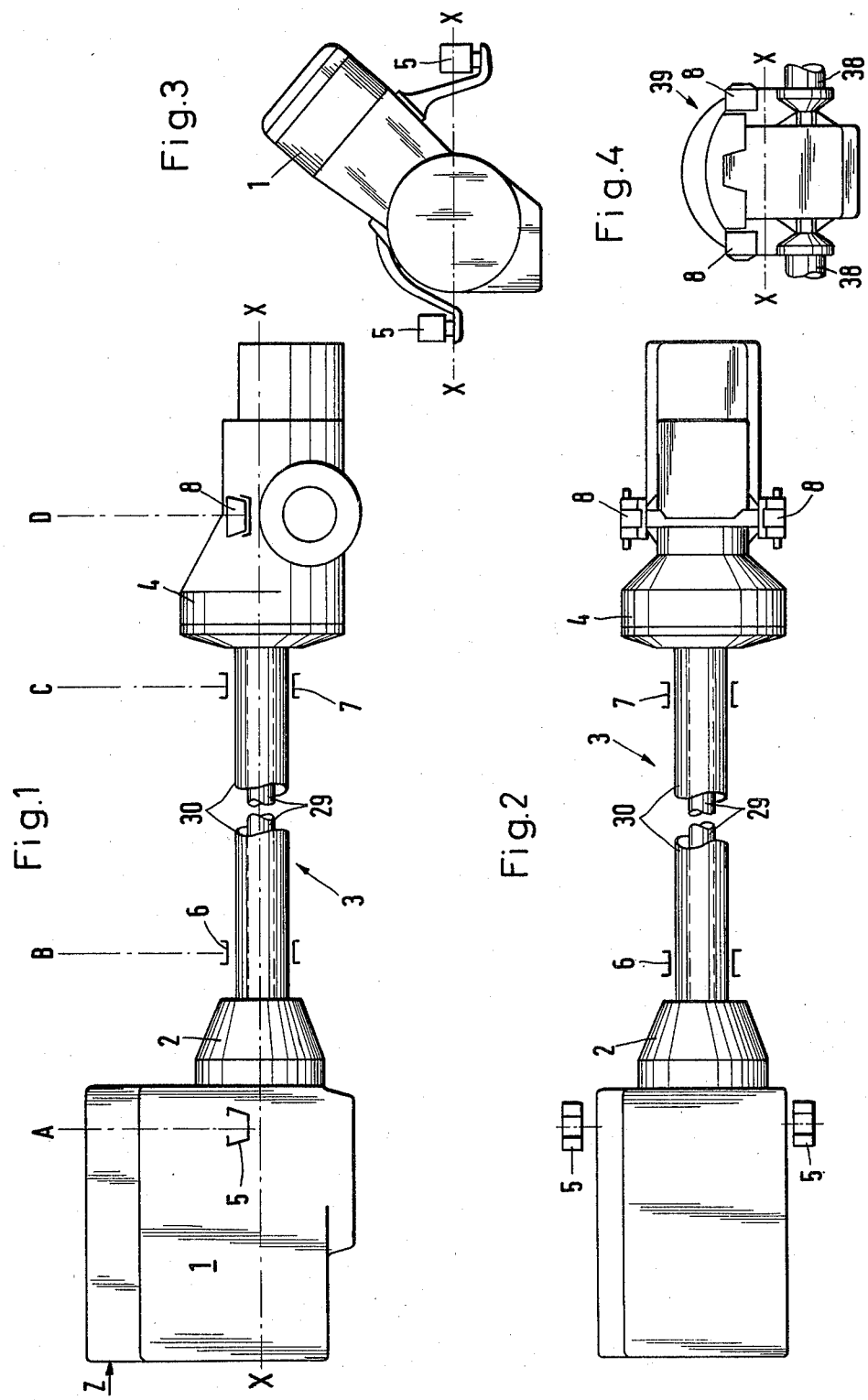

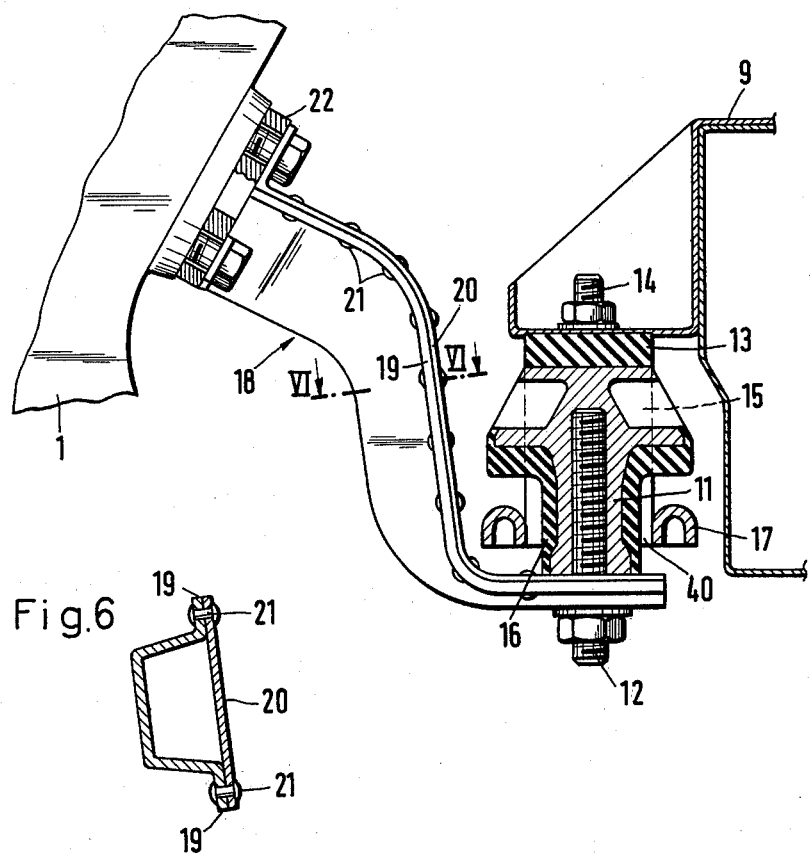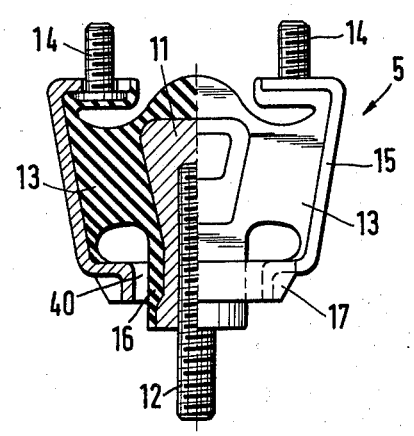

ARRANGEMENT FOR SUPPORT OF A MOTOR VEHICLE DRIVE UNIT

The present invention relates to an arrangement for the mounting support of a drive unit of a motor vehicle, especially of a passenger motor vehicle, which consists of an internal combustion engine with a clutch, of at least one change-speed transmission and of an axle gear, whereby preferably the change-speed transmission is combined together with the axle gear into a drive unit provided in the rear of the vehicle and is connected with the internal combustion engine accommodated in the front of the vehicle by way of a bracing or supporting tube aligned in the vehicle longitudinal direction, which internal combustion engine is in driving connection with the rear drive unit by way of a drive shaft arranged on the inside of the supporting tube.

In drive unit arrangements with a forward drive unit which is nearly rigidly connected with a rear drive unit by way of a tubular support member, vibrations and oscillations are produced by reason of reaction moments of the engine and of the transmission as well as by torques of drive shaft supported within the tubular support member and connecting with each other the drive units. These vibrations and oscillations may cause breakages and deformations of the mounting and bearing supports as well as of the aggregates of the drive unit if the bearing supports are exposed to high loads and stresses by a corresponding arrangement.

Consequently, it is proposed in the German Pat. No. 1,221,566 in connection with an arrangement of a drive unit in a motor vehicle in which the individual aggregates of the forward and of the rear drive unit are connected by way of a tubular support member, to construct the arrangement and its various components favorably from a vibrational point of view and to elastically suspend the same at the vehicle. The drive units are thereby connected with each other in a bending- and torsion-rigid manner by way of the tubular support or bracing member. This construction and arrangement of the aggregates of the drive units as well as the arrangement of the elastic bearing elements, without consideration of the factually existing local vibrational conditions of the drive unit as well as of the body, has as a consequence certain disadvantages because a swinging and oscillating of the aggregates may take place and the resulting vibrations and oscillations additionally stress the bearings.

The absorption of ocurring vibrations in connection with a drive unit arranged forwardly in the vehicle is disclosed in the German Pat. No. 696,354. The drive unit is supported for that purpose by means of elastic bearing supports, taking into consideration the actually existing vibrational conditions whereby return forces are opposed to the static and dynamic forces acting on the engine and the natural frequency of oscillation of the drive unit is kept low. The bearing supports for the fastening of the drive unit at the body of the vehicle are dimensioned corresponding to the occurring vibrations and oscillations.

In contradistinction thereto, it is the aim of the present invention to provide an arrangement of the aforementioned type in which the locations of the bearing supports of the aggregates of the drive unit and of the body are disposed in such areas that no disadvantageous loads and stresses act on the bearing supports and as few noises as possible are produced.

The underlying problems are solved according to the present invention in that the internal combustion engine together with the clutch, the tubular support member and the rear axle drive unit are each secured at the body by way of elastic members which are mounted within areas of low vibrations of the aggregates of the drive unit and are retained at least partly in form-rigid but vibration-damping mounting devices, whereby several bearing supports arranged at identical distances and within areas of low vibrations serve for the bearing support of the drive shaft within the tubular support member. It is achieved thereby in an advantageous manner according to the present invention that by the selection of the bearing places at the drive unit as well as at the body within areas of low vibrations, high loads and stresses are avoided in the bearing supports and a swinging and oscillating of the aggregates of the drive units in the bearing supports is prevented whereby no distinct, marked resonant vibrations can establish themselves.

In one embodiment according to the present invention, it is additionally proposed that the engine bearing supports and the transmission bearing supports are arranged on both sides of the aggregates in and above a horizontal plane formed by the drive shaft longitudinal axis.

Furthermore, provision is made according to the present invention that the engine support includes a universally elastically movable bearing core with a fastening screw, which core is connected by way of diametrally arranged elastic webs with an outer rigid bearing member carrying a threaded means, and the extension of the bearing core carrying the fastening screw extends freely movable within certain limits through a base plate of the rigid bearing member.

Furthermore, for purposes of assisting the damping of the oscillations and vibrations, provision is made according to the present invention that the engine is connected with engine bearing support arranged at the body by way of a bearer member and the bearer member consists of sheet metal parts suitably connected with each other. The bearer has a U-shaped cross section which is provided on its open side with a plate fastened by means of rivets on angularly bent leg portions of the bearer.

Furthermore, provision is made according to the present invention that the bearer member has an approximately S-shaped configuration which is reduced in cross section from the engine toward the bearing support and the bearer member carries on its side facing the engine a mounting plate which is constructed for receiving screws or bolts for the fastening at the engine. As a result thereof, according to the present invention, the areas of low vibrations and oscillations of the engine and of the body are connected with each other in an advantageous manner by way of a bearer and rubber-metal elements whereby the bearer dampens residual oscillations and vibrations. A damping by molecular friction is achieved by the particular construction of the bearer member.

Furthermore, the present invention is characterized by a transmission bearing support having a rigid housing, in which is arranged a central bearing part connected with the housing by way of diametrally arranged elastic webs whereby the central bearing part includes at the front side a screw embedded in the elastic core and at the housing rear wall a means for receiving a fastening means.

Additionally, provision is made according to the present invention that an axle drive, i.e., an output from the axle gear, is arranged at the transmission of the vehicle within the area of a vibrational or oscillating minimum in a vertical center longitudinal plane of the transmission bearing support extending transversely to the vehicle longitudinal direction. Vibrations at the drive shaft are reduced thereby and a transmission of the vibrations to other aggregates is far-reachingly prevented thereby.

These and other objects, features and advantages of the present invention will become more apparent from the following description when taken in connection with the accompanying drawing which shows, for purposes of illustration only, one embodiment in accordance with the present invention, and wherein:

FIG. 1 is a schematic side elevational view of a drive unit of a vehicle in accordance with the present invention;

FIG. 2 is a schematic plan view on the drive unit of FIG. 1;

FIG. 3 is an elevational view of the engine as viewed in the direction Z of FIG. 1;

FIG. 4 is an elevational view of the transmission as viewed in the direction Z of FIG. 1;

FIG. 5 is a partial view of the engine mounting with bearing supports according to FIG. 3 illustrated in cross section and with an engine support arm;

FIG. 6 is a cross-sectional view taken along line VI—VI of FIG. 5;

FIG. 7 is an elevational view of the engine bearing support, partly in cross section and taken at right angle to FIG. 5;

FIG. 8 is a plan view on an engine bearing support according to FIG. 7;

Figure 9:
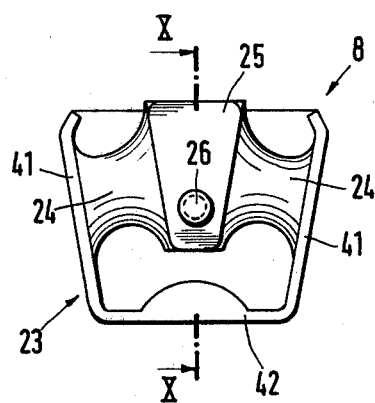
FIG. 9 is a front elevational view of a transmission bearing support.

Referring now to the drawing wherein like reference numerals are used throughout the various views to designate like parts, the drive unit, consisting of an internal combustion engine 1, of a clutch 2, of a "trans-axle system" generally designated by reference numeral 3 and of a transmission 4 with an axle drive or output 38 is suspended or supported at a relatively fixed part 9 of the vehicle, such as the body, frame or analogous parts of the vehicle.

As "trans-axle system" 3 is designated the force transmission system between engine-clutch and transmission and between engine and clutch-transmission with a drive unit arranged forwardly in the vehicle and with a drive unit arranged rearwardly in the vehicle. The "trans-axle system" 3 essentially consists of a tubular support member 30 of any desired cross section rigidly connecting the forward drive unit 1, 2 with the rear drive unit 4, 38. A drive shaft 29 is supported in the tubular support member 30.

Figure 15:
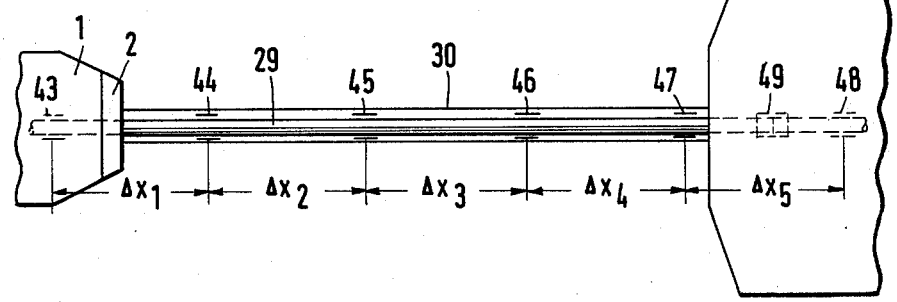
FIG. 15 is a schematic view of the "trans-axle" with an arrangement of the bearing supports for the shaft according to the present invention.

Bearing supports 5 and 8 are provided on both longitudinal sides of the engine 1 and of the transmission 4. Similarly, the tubular support member 30 is supported in bearing supports 6 and 7 and the shaft 29 is supported in bearing supports 44 to 48 (FIG. 15). The bearing supports 5 to 8 as well as 44 to 48 are arranged respectively within the area of the smallest vibrations and oscillations of the drive unit (engine, clutch, "trans-axle", transmission) which can be determined by experiments during the operation of the aggregates under different load conditions of the entire drive unit. It has been discovered that there exist, for example, planes A, B, C and D (FIG. 1) at the engine 1 with the clutch 2, at the "trans-axle system" 3 as well as at the transmission 4, in which small oscillations and vibrations occur respectively. The bearing supports for the individual aggregates are preferably arranged within these low-vibrational planes A, B, C and D. The aggregate bearing supports are additionally arranged, in adaptation to the body, also in that case within zones where a vibration minimum prevails.

The bearing supports 5 of the engine 1 as well as the bearing supports 8 of the transmission 4 are so constructed that they are able to absorb larger forces in a vertical load direction than in the horizontal direction. They reduce the transmission of body noises and droning whereby an improvement of the noise- and vibration-comfort is achieved in the interior space. Furthermore, the aggregates may be supported thereby nearly decoupled, i.e., the generation of adjacent natural frequencies can be kept small which is attainable by the positioning of the bearing supports and by different rigidities in different load directions. Furthermore, the aggregates can be supported over-critically, i.e., the resonance frequency of the suspension no longer coincides with other resonances, for example, with the wheel natural frequencies. The aggregate deflections are also kept within permissive limits by the arrangement and construction of the bearing supports in accordance with the present invention.

For combining these numerous criteria, the engine bearing supports 5 consist preferably of a rubber-metal element, whereby an elastically supported inner bearing core 11 is provided at a rigid bearing member 15, which bearing core 11 is connected with the bearing member 15 by way of diametrally arranged elastic webs 13. The bearing member 15 includes a base plate 17 which is provided with an aperture 40, through which projects freely movable within certain limits a screw 12 suitably fixed in the bearing core 11 and formed-in within the lower extension 16 of the elastic webs 13. Furthermore, threaded means 14 are provided at the rigid bearing member 15 which serve to establish a connection with the body or frame 9 (FIG. 5). The fastening screw 12 provided in the extension 16 of the bearing core 11 is connected with a bearer 18 which establishes a connection with the engine 1.

The bearer 18 has preferably an approximately S-shaped configuration which is reduced in cross section from the engine 1 toward the bearing support 5 and is of U profile-shaped cross section whereby a plate 20 is secured by means of rivets 21 or the like at its open side onto angular bent-off legs 19 of the profile. Resonances are decreased by the bearer 18 (FIGS. 5 and 6) since a molecular friction can take place between the U-shaped profile and the riveted-on plate 20.

Figure 10:
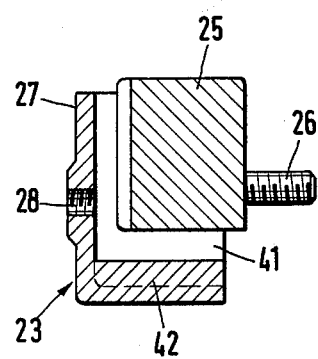
FIG. 10 is a partial cross-sectional view through the transmission bearing support according to line X—X of FIG. 9.

The transmission bearing supports 8 (FIGS. 9 and 10) consist preferably of a rigid housing generally designated by reference numeral 23 which includes a rear wall 27, side walls 41 as well as a bottom 42. A bearing member 25 elastically supported by way of diametrally arranged webs 24 is provided on the inside of the housing 23, which is suspended so as to be elastically movable. The bearing member 25 includes a forward fastening screw 26 embedded in the elastic core. A receiving means, for example, in the form of a threaded bore 28 for a fastening means is provided in the rear wall 27 of the rigid housing 23.

FIG. 15 illustrates the drive shaft 29 supported in the bearings 43 to 47 whereby the bearing support 43 serves as crankshaft bearing in the forward drive unit and the bearing support 48 as bearing for the transmission input shaft in the rear drive unit. Similarly to the arrangement of the engine and transmission bearing supports 5 and 8 within areas of low vibrations and oscillations, also the drive shaft 29 is supported within areas of low oscillations and vibrations.

For reducing the excitation of the drive shaft 29 by vibrations and oscillations of adjacent aggregates of the drive unit, it is appropriate to place the resonant frequency of the drive connection (drive shaft-transmission input shaft) above the exciting frequency of the drive unit. This can take place in a simple manner in connection with a drive shaft that is rigidly connected with the transmission input shaft by a clamping sleeve 49, by a uniform bearing support arrangement at distances of $\Delta x_1$ to $\Delta x_5$ over the entire length of the shaft. The shaft connection by way of the clamping sleeve 49 also offers the advantage that no bearing has to be arranged directly adjacent the sleeve as would be necessary with a drive shaft connected by way of a joint. Hence, the bearing support distances of the bearing supports 43 to 48 as well as the local coordination of the bearing support at the aggregate can be arranged favorably from a vibrational point of view with respect to the other aggregates of the drive unit.

Figure 11:
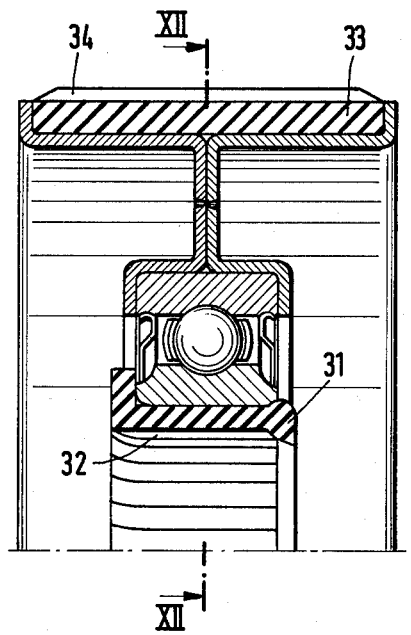
FIG. 11 is a cross-sectional view through a bearing support construction for a shaft of the "trans-axle system" according to the present invention.
Figure 12:
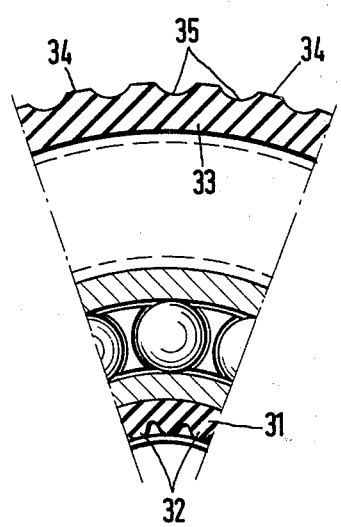
FIG. 12 is a cross-sectional view taken along line XII—XII of FIG. 11.
Figure 13:
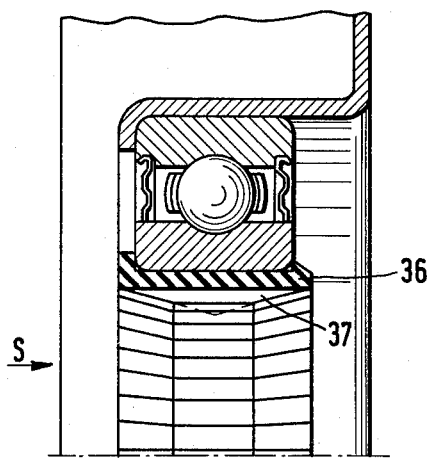
FIG. 13 is a partial cross sectional view through a further embodiment of the shaft bearing support in accordance with the present invention.
Figure 14:
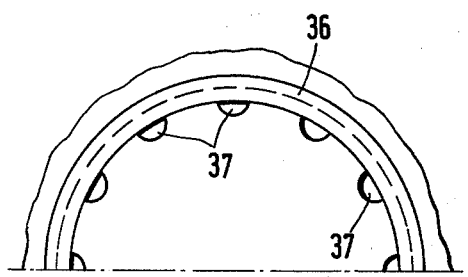
FIG. 14 is a partial elevational view as viewed in the direction S of FIG. 13.

In order that vibrations emanating from the shaft 29 can be effectively damped and tolerances or out-of-rounds of the shaft can be compensated for, the shaft bearing supports 44 to 48 include an inner spacer bushing or sleeve 31 as an outer spacer bushing or sleeve 33 (FIGS. 11 and 12). The inner spacer bushing or sleeve 31 includes inwardly projecting radial webs 32 which exert a pressure on the shaft 29. The outer spacer bushing or sleeve 33 also includes axially extending webs 34 and grooves 35 whereby a pressure is exerted on the tubular support member 30. According to a further embodiment of the bearing supports 44 to 48, the bearing includes an inner spacer bushing or sleeve 36 which has radial webs 37 that are constructed tapering toward one another along the sides at an angle, as indicated in dash and dotted lines in FIG. 13.

A damping of residual vibrations is achieved by this particular shaft bearing support construction which supports the shaft 29 of the tubular support member 30 and of the transmission, inherently acting in a vibration-increasing manner, so as to provide low vibrations. The spacer bushings or sleeves are applicable not only to shafts of a "trans-axle system" 3 but also for the bearing supports of shafts for any desired application.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the support of a drive unit of a motor vehicle which includes an internal combustion engine with a clutch, at least one change-speed transmission and an axle gear, and in which the internal combustion engine is connected with the axle gear by way of a tubular support means, characterized in that the internal combustion engine with the clutch, the tubular support means and the axle gear are fastened at the vehicle body respectively by way of elastic bearing support means which are provided within the areas of low vibrations of the aggregates of the drive unit and are held, at least in part, in supporting means which are relatively form-rigid, yet vibration-damping, the internal combustion engine is connected by way of a bearer means with the engine bearing support means supported at body, and in that the bearer means has a U-shaped cross section which is provided at its open side with a plate secured by means of rivets on angularly bent-off legs of the bearer means.

2. An installation according to claim 1, with a drive shaft within the tubular support means, characterized in that for purposes of supporting the drive shaft within the tubular support means, several bearing support means are provided which are disposed at substantially equal distances and within areas of low vibrations.

3. An installation according to claim 1, characterized in that the change-speed transmission is combined together with the axle gear into a drive unit arranged in the rear of the vehicle while the internal combustion engine is mounted in the front section of the vehicle.

4. An installation according to claim 3, characterized in that the vehicle is a passenger motor vehicle.

5. An installation according to claim 1, characterized in that the engine bearing support means and the transmission bearing support means are arranged on both sides of the aggregates in and above a horizontal plane formed by the drive shaft longitudinal axis.

6. An installation according to claim 1, characterized in that the engine bearing support means includes a support core means universally elastically movable and having a threaded fastening member, said core means being operatively connected with an outer rigid bearing member by way of substantially diametrally arranged elastic web means, said rigid bearing member carrying threaded means and including a base plate, said core means having an extension carrying the threaded fastening member, which extends through the base plate of the rigid member freely movably within certain limits.

7. An installation according to claim 1, with a drive shaft within the tubular support means, characterized in that for purposes of supporting the drive shaft within the tubular support means, several bearing support means are provided which are disposed within areas of low vibrations.

8. An installation according to claim 7, characterized in that the engine bearing support means and the transmission bearing support means are arranged on both sides of the aggregates in and above a horizontal plane formed by the drive shaft longitudinal axis.

9. An installation according to claim 1, characterized in that the bearer means has an approximately S-shaped configuration which is reduced in cross section from the engine toward the bearing support means, and the bearer means carries at its end face facing the engine a mounting plate which is constructed to receive threaded members for the fastening at the engine.

10. An installation according to claim 1, characterized in that the drive shaft supported between the clutch and the transmission is constructed subdivided and the individual shaft parts are connected bending-rigid within the area of the transmission by way of a clamping sleeve means.

11. An installation according to claim 1, characterized in that an axle drive means is arranged at the transmission of the vehicle within the area of a vibrational minimum in a vertical plane extending transversely to the vehicle longitudinal direction.

12. An installation for the support of a drive unit of a motor vehicle which includes an internal combustion engine with a clutch, at least one change-speed transmission and an axle gear, and in which the internal combustion engine is connected with the axle gear by way of a tubular support means, characterized in that the internal combustion engine with the clutch, the tubular support means and the axle gear are fastened at the vehicle body respectively by way of elastic bearing support means which are provided within areas of low vibrations of the aggregates of the drive unit and are held, at least in part, in supporting means which are relatively form-rigid, yet vibration-damping, a drive shaft within the tubular support means, several bearing support means for supporting the drive shaft within the tubular support means, said bearing support means being disposed within areas of low vibrations, and in that the drive shaft is supported within the tubular support means by way of bearing support means provided with internal spacer sleeve means which include radial tapering webs extending axially and arranged distributed over the circumference.

13. An installation according to claim 12, characterized in that the engine is connected by way of a bearer means with the engine bearing support means supported at the body.

14. An installation according to claim 13, characterized in that the bearer means consists of sheet metal parts connected with each other.

15. An installation for the support of a drive unit of a motor vehicle which includes an internal combustion engine with a clutch, at least one change-speed transmission and an axle gear, and in which the internal combustion engine is connected with the axle gear by way of a tubular support means, characterized in that the internal combustion engine with the clutch, the tubular support means and the axle gear are fastened at the vehicle body respectively by way of elastic bearing support means which are provided within areas of low vibrations of the aggregates of the drive unit and are held, at least in part, in supporting means which are relatively form-rigid, yet vibration-damping, a transmission bearing support means having a rigid housing means in which is arranged a central bearing member operatively connected with the housing means by way of substantially dimetrally arranged web means, said central bearing member including at the front end a threaded member and said housing means including a rear housing wall provided with means for receiving a fastening means.

16. An installation according to claim 15, characterized in that the change-speed transmission is combined together with the axle gear into a drive unit arranged in the rear of the vehicle while the internal combustion engine is mounted in the front section of the vehicle.

17. An installation according to claim 15, characterized in that the engine bearing support means includes a support core means universally elastically movable and having a threaded fastening member, said core means being operatively connected with an outer rigid bearing member by way of substantially diametrally arranged elastic web means, said rigid bearing member carrying threaded means and including a base plate, said core means having an extension carrying the threaded fastening member, which extends through the base plate of the rigid bearing member freely movably within certain limits.

18. An installation for the support of a drive unit of a motor vehicle which includes an internal combustion engine with a clutch, at least one change-speed transmission and an axle gear, and in which the internal combustion engine is connected with the axle gear by way of a tubular support means, characterized in that the internal combustion engine with the clutch, the tubular support means and the axle gear are fastened at the vehicle body respectively by way of elastic bearing support means which are provided within areas of low vibrations of the aggregates of the drive unit and are held, at least in part, in supporting means which are relatively form-rigid, yet vibration-damping, a drive shaft within the tubular support means, several bearing support means for supporting the drive shaft within the tubular support means, said several bearing support means being disposed within areas of low vibrations, and in that the drive shaft is supported in the tubular support means by way of bearing support means which have an elastic inner spacer sleeve means that has radial webs projecting toward the shaft and an elastic outer spacer sleeve means, at which are provided axially extending webs and grooves arranged distributed along the outer circumference.

19. An installation according to claim 18, characterized in that the engine is connected by way of a bearer means with the engine bearing support means supported at the body.

20. An installation according to claim 19, characterized in that the bearer means consists of sheet metal parts connected with each other.

21. An installation for the support of a drive unit of a motor vehicle which includes an internal combustion engine with a clutch, at least one change-speed transmission and an axle gear, and in which the internal combustion engine is connected with the axle gear by way of a tubular support means, characterized in that the internal combustion engine with the clutch, the tubular support means and the axle gear are fastened at the vehicle body respectively by way of elastic bearing support means which are provided within areas of low vibrations of the aggregates of the drive unit and are held, at least in part, in supporting means which are relatively form-rigid, yet vibration-damping, a drive shaft within the tubular support means, several bearing support means for supporting the drive shaft within the tubular support means, said several bearing support means being disposed at substantially equal distances and within areas of low vibrations, a change-speed transmission combined together with the axle gear into a drive unit arranged in the rear of the vehicle with the internal combustion engine being mounted in the front section of the vehicle, the engine bearing support means and the transmission bearing support means being arranged on both sides of the aggregates in and above a horizontal plane formed by the drive shaft longitudinal axis, the engine bearing support means includes a support core means universally elastically movable and having a threaded fastening member, said core means being operatively connected with an outer rigid bearing member by way of substantially diametrally arranged elastic web means, said rigid bearing member carrying threaded means and including a base plate, said core means having an extension carrying the threaded fastening member which extends through the base plate of the rigid bearing member freely movable within certain limits, the engine is connected by way of a bearer means with the engine bearing support means supported at the body, the bearer means consists of sheet metal parts connected with each other, and in that the bearer means has a U-shaped cross section which is provided at its open side with a plate secured by means of rivets on angularly bent-off legs of the bearer means.

22. An installation according to claim 21, characterized in that the bearer means has an approximately S-shaped configuration which is reduced in cross section from the engine toward the bearing support means, and the bearer means carries at its end face facing the engine a mounting plate which is constructed to receive threaded members for the fastening at the engine.

23. An installation according to claim 22, characterized by a transmission bearing support means having a rigid housing means in which is arranged a central bearing member operatively connected with the housing means by way of substantially diametrally arranged web means, said central bearing member including at the front end a threaded member and said housing means including a rear housing wall provided with means for receiving a fastening means.

24. An installation according to claim 23, characterized in that the drive shaft supported between the clutch and the transmission is constructed subdivided and the individual shaft parts are connected bending-rigid within the area of the transmission by way of a clamping sleeve means.

25. An installation according to claim 24, characterized in that an axle drive means is arranged at the transmission of the vehicle within the area of a vibrational minimum in a vertical plane extending transversely to the vehicle longitudinal direction.

26. An installation according to claim 25, characterized in that the drive shaft is supported in the tubular support means by way of bearing support means which have an elastic inner spacer sleeve means that has radial webs projecting toward the shaft and an elastic outer spacer sleeve means, at which are provided axially extending webs and grooves arranged distributed along the outer circumference.

27. An installation according to claim 25, characterized in that the drive shaft is supported within the tubular support means by way of bearing support means provided with internal spacer sleeve means which include radial tapering webs extending axially and arranged distributed over the circumference.

* * * * *